United States Patent
Harita et al.

[11] Patent Number: 5,975,431
[45] Date of Patent: Nov. 2, 1999

[54] WASHER NOZZLE AND WASHER APPARATUS FOR VEHICLE

[75] Inventors: Yasuhiro Harita, Kosai; Hiroshi Suzuki, Toyohashi; Tosimi Noguchi, Kosai, all of Japan

[73] Assignee: ASMO Co., Ltd., Kosai, Japan

[21] Appl. No.: 08/956,367

[22] Filed: Oct. 23, 1997

[30] Foreign Application Priority Data

| May 21, 1997 | [JP] | Japan | 9-131358 |
| Jul. 18, 1997 | [JP] | Japan | 9-193690 |
| Jul. 28, 1997 | [JP] | Japan | 9-201511 |

[51] Int. Cl.$^6$ ............................................. B05B 1/10
[52] U.S. Cl. ........................... 239/284.1; 239/284.2; 239/589; 239/589.1; 239/597; 239/601; 15/322
[58] Field of Search ..................... 239/284.1, 284.2, 239/589, 589.1, 597, 601; 15/322

[56] References Cited

U.S. PATENT DOCUMENTS

| 2,793,912 | 5/1957 | Krohm | 239/248.1 |
| 2,898,036 | 8/1959 | Newill | 239/284.1 X |
| 3,008,649 | 11/1961 | Bock et al. | 239/284.1 |
| 3,067,955 | 12/1962 | Heath | 239/284.1 X |

FOREIGN PATENT DOCUMENTS

| 61-57452 | 3/1986 | Japan . |
| 62-86265 | 6/1987 | Japan . |
| 64-2540 | 1/1989 | Japan . |
| 2-58139 | 12/1990 | Japan . |

Primary Examiner—Andres Kashnikow
Assistant Examiner—Robin O. Evans
Attorney, Agent, or Firm—Burns, Doane, Swecker & Mathis, LLP

[57] ABSTRACT

A jetting opening for jetting a washer fluid is formed on a jet fitted under pressure in a nozzle body installed on a hood of a vehicle. The jetting opening is formed on a bottom of cross-shaped grooves formed at a front part of the jet. The jetting opening is slot-shaped and extends in a lengthwise direction thereof and communicates with the domed portion positioned at a front portion of a fluid passage for feeding the washer fluid to the jet. The area of the jetting opening is reduced by a reducing portion positioned at the center of the jetting opening in the lengthwise direction thereof. Both sides of the reducing portion are symmetrical with respect to a line passing through the center of the reducing portion and extending in the lengthwise direction of the reducing portion. Thus, the jetting opening is gourd-shaped.

6 Claims, 11 Drawing Sheets

WASHER NOZZLE AND WASHER APPARATUS FOR VEHICLE

BACKGROUND OF THE INVENTION

1. Field of the Invention

The present invention relates to a washer nozzle and a washer apparatus for a vehicle for jetting a washer fluid to a predetermined part of a windshield glass of a vehicle.

2. Description of Related Art

Normally, on a hood of a vehicle, there is provided a pair of right-hand and left-hand washer nozzles for jetting a washer fluid to a front windshield glass of the vehicle for wiping the front windshield glass with wiper blades. The washer nozzles are disclosed in Japanese Patent Publications Nos. 64-2540 and 2-58139, Laid-Open Japanese Patent Publication No. 61-57452, and Laid-Open Japanese Utility Model Publication No. 62-86295.

As the type of the washer nozzle, a fluidics type, flat spray type, and jet type are known. In the washer nozzle of the fluidics type, the washer fluid is sprayed on the front windshield glass at a uniform density. The washer nozzle of this type has a disadvantage that the washer fluid sprayed on the front windshield glass obstructs the visual field of a vehicle driver. The washer nozzle of the flat spray type has been developed to overcome the disadvantage of the fluidics type. In the washer nozzle of the flat spray type, the atomized washer fluid is sprayed on the center part of the washer fluid-sprayed region at a density lower than that at both sides in the washer fluid-sprayed region. The washer nozzles of these two types have an advantage that the washer fluid is jetted widely on the front windshield glass, but have a disadvantage that the washer fluid is sprayed on the front windshield glass at a decreased percentage during a high-speed running of the vehicle because wind which strikes the front windshield glass blows off the sprayed washer fluid. The washer nozzle of the jet type has an advantage that the washer fluid is jetted to an elevated position of the front windshield glass even when the vehicle is running at a high speed, but has a disadvantage that the washer fluid cannot be sprayed widely on the front windshield glass.

In the washer nozzle of the flat type, the front part of the channel of the nozzle body, through which the washer fluid flows is domed, and a slot-shaped jetting opening is formed in one direction on the domed portion. The domed surface allows the washer fluid flowing through the channel to be collected at the center of front part of the channel. Thus, the atomized washer fluid is jetted from the jetting opening in a predetermined jet angle in the lengthwise direction thereof. The atomized washer fluid is sprayed on the center part of the front windshield glass at a density lower than that at the both sides thereof.

In the washer nozzle of the flat type, the atomized washer fluid is sprayed on the center part of the front windshield glass at a density lower than that at the both sides thereof, and yet the density of the atomized washer fluid is not so low as to allow the driver to secure the visual field. Further, wind causes the height of the washer fluid-sprayed position to be much lower when the vehicle is running at a high speed. Thus, the part of the front windshield glass corresponding to the visual field cannot be cleaned sufficiently.

SUMMARY OF THE INVENTION

It is accordingly an object of the present invention to provide a washer nozzle and a washer apparatus which ensures a driver to secure the visual field when a washer fluid is jetted to a window windshield glass of a vehicle and ensures the height of a washer fluid-sprayed position to be secured when the vehicle is running at a high speed.

According to the present invention, a washer nozzle is constructed so that a washer fluid which has flowed through a channel is collected at the center of a fluid passage along a domed portion formed at the front end thereof. Then, the washer fluid is jetted from the gourd-shaped jetting opening at a predetermined angle in the lengthwise direction of a jetting opening. At this time, the flow rate of the washer fluid is reduced at the center of the jetting opening in its lengthwise direction by a reducing portion, whereas the flow rate thereof is increased at both sides of the jetting opening in its lengthwise direction. Because the area of the jetting opening is reduced at the center thereof in its lengthwise direction, the flow rate of the washer fluid at the center of the jetting opening in its lengthwise direction is smaller than the flow rate thereof at the center of the conventional jetting opening in its lengthwise direction, whereas the flow rate thereof at both sides of the jetting opening in its lengthwise direction is greater than the flow rate thereof at both sides of the conventional one in its lengthwise direction. This is because the conventional jetting opening is not provided with the reducing portion. The pressure of the washer fluid at both sides of the jetting opening in its lengthwise direction is higher that of the washer fluid at both sides part of the conventional jetting opening in its lengthwise direction, which causes the jetting speed at both sides of the jetting opening in its lengthwise direction to be faster than that at both sides of the conventional jetting opening in its lengthwise direction. Consequently, the density of the washer fluid which lands on the washer fluid-sprayed region of the front windshield glass is low at the center thereof and high at the both sides thereof, the driver is obstructed less, and the range of the washer fluid-sprayed region is increased in the both sides of the jetting opening in the lengthwise direction thereof. Further, the flow rate of the washer fluid jetted from the jetting opening is high at both sides of the jetting angle of the washer fluid jetted from the jetting opening and thus the washer fluid is jetted from both sides at a speed higher than that of the washer fluid jetted from the conventional jetting angle. Accordingly, when the vehicle is running at a high speed, the washer nozzle is capable of jetting the washer fluid higher than that of the conventional one.

Preferably, the jetting opening is gourd-shaped such that both sides of the jetting opening are symmetrical with respect to a line passing through the center of the reducing portion. Therefore, the area of the washer fluid is reduced at the center of the jetting opening when it is jetted.

Preferably, the reducing portion projects symmetrically 0.1 mm or more from both sides of the jetting opening in a widthwise direction thereof. Accordingly, when the washer fluid is jetted from the jetting opening, it is reduced sufficiently by the reducing portion.

Preferably, the jetting angle of the washer fluid jetted from the jetting opening is set to 12°–45°. Therefore, this is suitable for a washer nozzle of flat spray type for a vehicle.

BRIEF DESCRIPTION OF THE DRAWINGS

Other objects, features and advantages of the present invention will be made more clear by the following detailed description with reference to the accompanying description, in which.

DETAILED DESCRIPTION OF THE PRESENTLY PREFERRED EMBODIMENTS

The present invention will be described below with reference to its embodiment and modifications.

Figure 1:
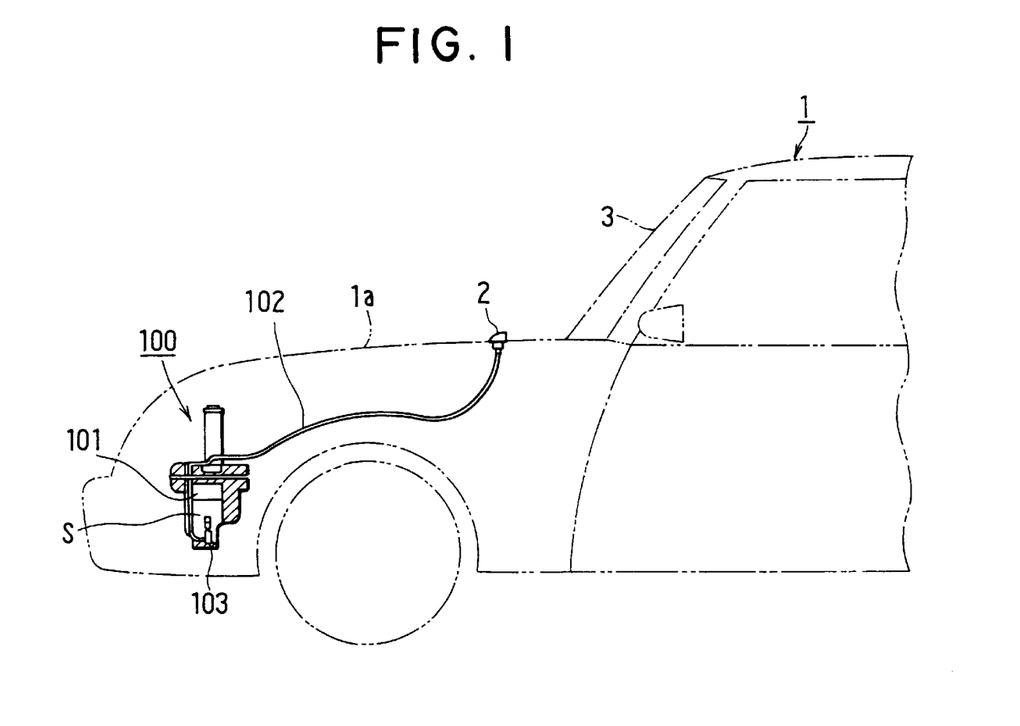
FIG. 1 is a schematic side view showing a washer apparatus for a vehicle.

As shown in FIG. 1, on a hood 1a of a body 1 of a vehicle, a pair of washer nozzles 2 of flat spray type is installed. One washer nozzle 2 points to the left-hand side of a front windshield glass 3, whereas the other washer nozzle 2 points to the right-hand side thereof. The washer nozzle 2 constitutes a component part of a washer apparatus 100 installed on a front part of the vehicle. The washer apparatus 100 comprises a washer tank 101 for storing a washer fluid S and a washer pump 103 for feeding under pressure the washer fluid S stored in the washer tank 101 to the washer nozzle 2 through a hose 102. That is, the washer apparatus 100 comprises the washer nozzle 2, the hose 102, the washer thank 101, and the washer pump 103.

Figure 2:
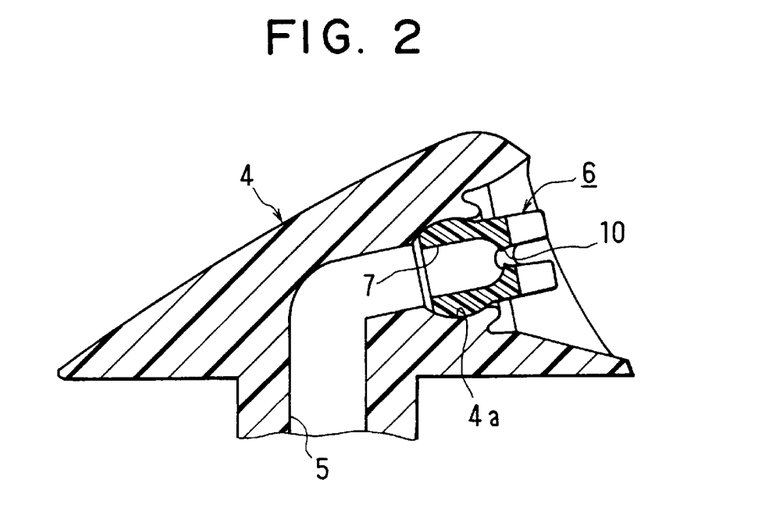
FIG. 2 is a sectional side view showing a washer nozzle used in the washer apparatus shown in FIG. 1.
Figure 3:
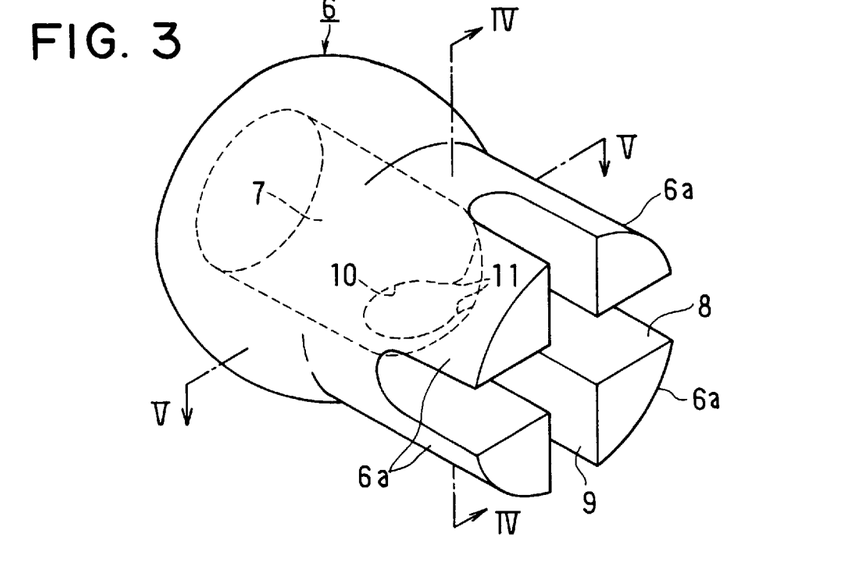
FIG. 3 is a perspective view showing a jet for the washer nozzle shown in FIG. 2 according to an embodiment of the present invention.
Figure 4:
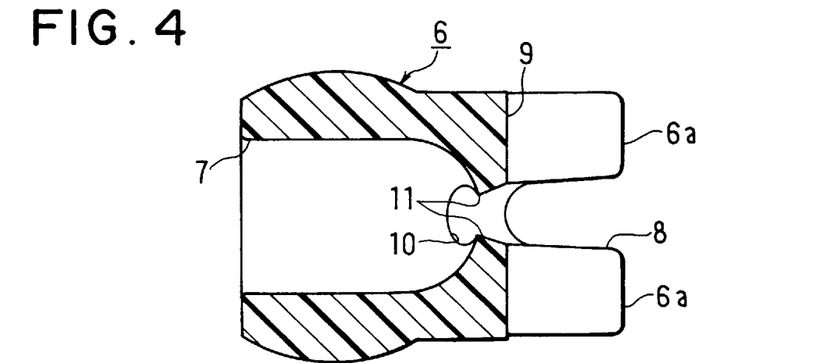
FIG. 4 is a sectional view taken along a line IV—IV in FIG. 3.
Figure 5:
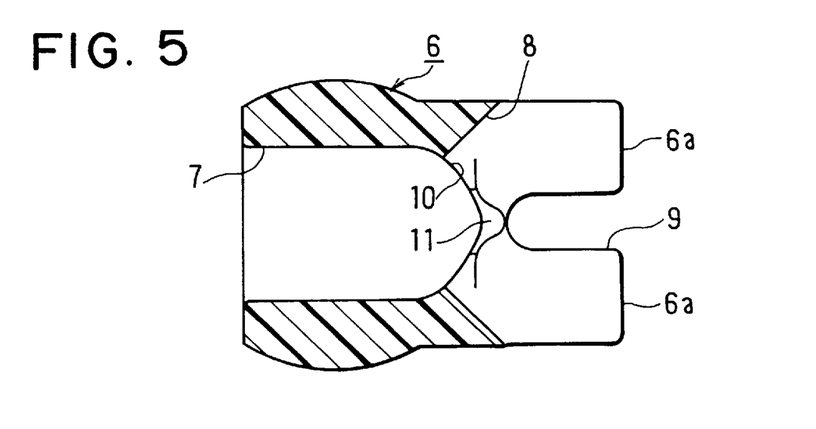
FIG. 5 is a sectional view taken along a line V—V in FIG. 3.

The washer nozzle 2 comprises, as shown in FIG. 2, a resinous nozzle body 4 mounted on the hood 1a and a resinous jet 6 fitted in a concavity or concave 4a positioned at the exit of a channel 5 formed in the nozzle body 4. The channel 5 serves as a passage of the washer fluid S. The inner surface of the concave 4a of the channel 5 is spherically and circumferentially formed. The outer surface of the base of the jet 6 is spherically and circumferentially formed so that the base of the jet 6 can be fitted tightly in the concave 4a. Therefore, the jet 6 fitted ark in the concave 4a under pressure is slidably rotatable around its longitudinal axis. In the jet 6, a cylindrical fluid passage 7 is formed to extend rearward and is open at the rear thereof. The fluid passage 7 communicates with the channel 5 when the jet 6 is fitted in the concave 4a under pressure. The front part (exit of washer fluid) of the fluid passage 7 is domed.

Figure 6:
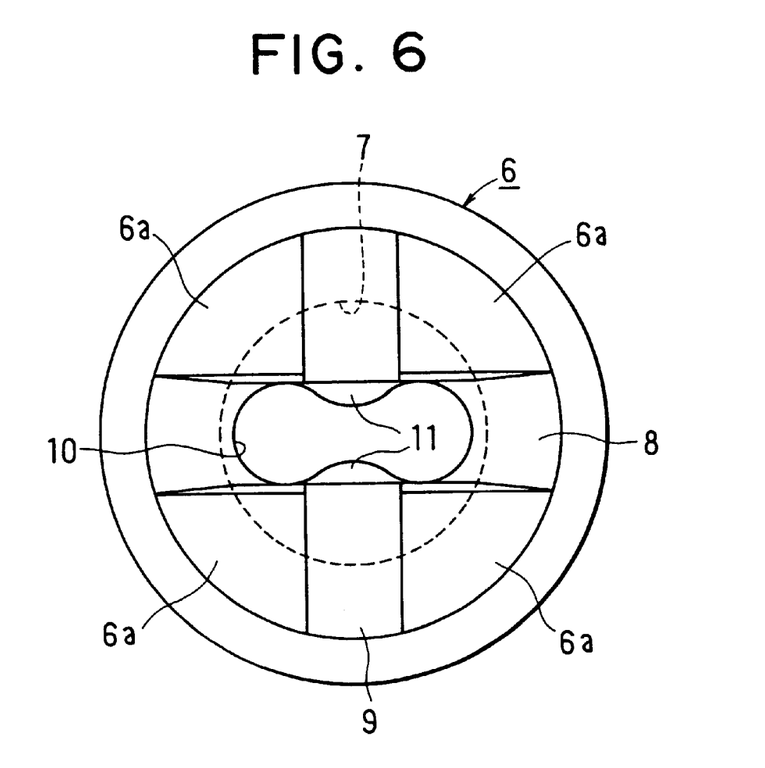
FIG. 6 is a front view showing the jet.

The jet 6 has, as shown in FIGS. 3 through 7, four extended portions 6a defined by cross-shaped grooves 8 and 9 formed by cutting the jet 6 rearward from the front part thereof. A gourd-shaped jetting opening 10 communicating with the fluid passage 7 at the domed portion thereof is formed at the bottom of the groove 8 such that the lengthwise or longitudinal direction of the jetting opening 10 is coincident with the extended direction of the groove 8. As shown in FIG. 6, the area of the center of the jetting opening 10 in the lengthwise direction thereof is reduced by a pair of confronting reducing portions 11 projecting symmetrically from both sides of the jetting opening 10 in the widthwise direction thereof.

Figure 7:
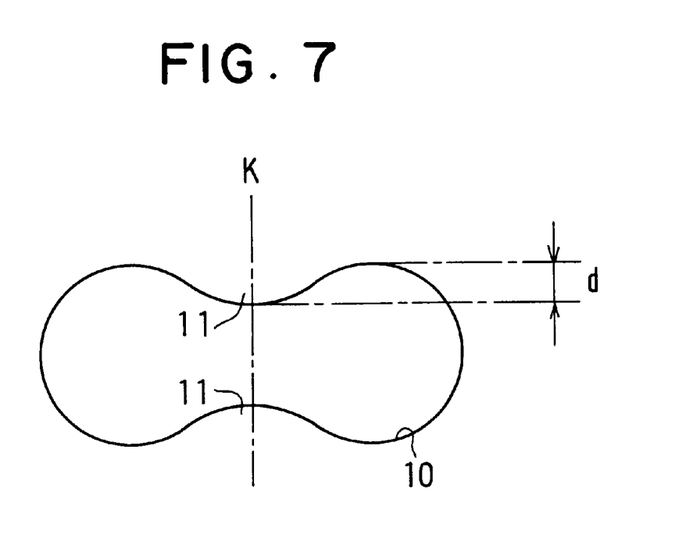
FIG. 7 is a front view showing a jetting opening.

As shown in FIG. 7, the jetting opening 10 is gourd-shaped and symmetrical with respect to a center line K passing through the center thereof in its lengthwise direction and bisects the area of the jetting opening 10. The reducing portions 11 have a curvature varied continuously with the curvatures of other portions of the jetting opening 10. The projected amount d of the reducing portion 11 is 0.1 mm or more relative to the maximum width in the widthwise direction of the jetting opening 10. Thus, the jetting opening 10 is reduced 0.2 mm or more at the longitudinal center in the lengthwise direction thereof. Preferably, the projected amount d of the reducing portion 11 is set to 0.13 mm. The cross-shaped grooves 8 and 9 are formed to rotate the jet 6 relatively to the concave 4a by using a tool such as a driver. That is, the grooves 8 and 9 are formed to adjust the orientation of the jetting opening 10, thus having no influence on an operation of jetting the washer fluid S.

Figure 8:
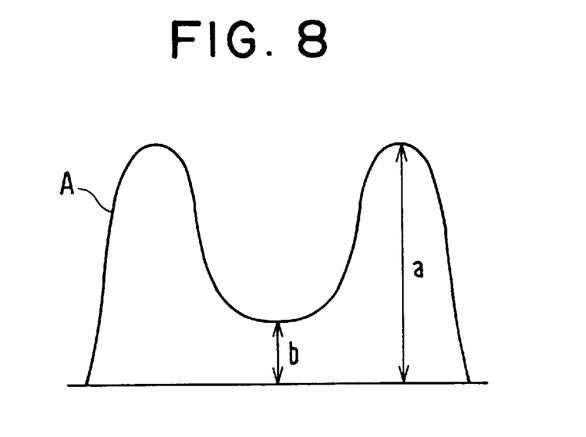
FIG. 8 is a view showing a flow rate distribution pattern of a flay spray type-washer nozzle.
Figure 10A:
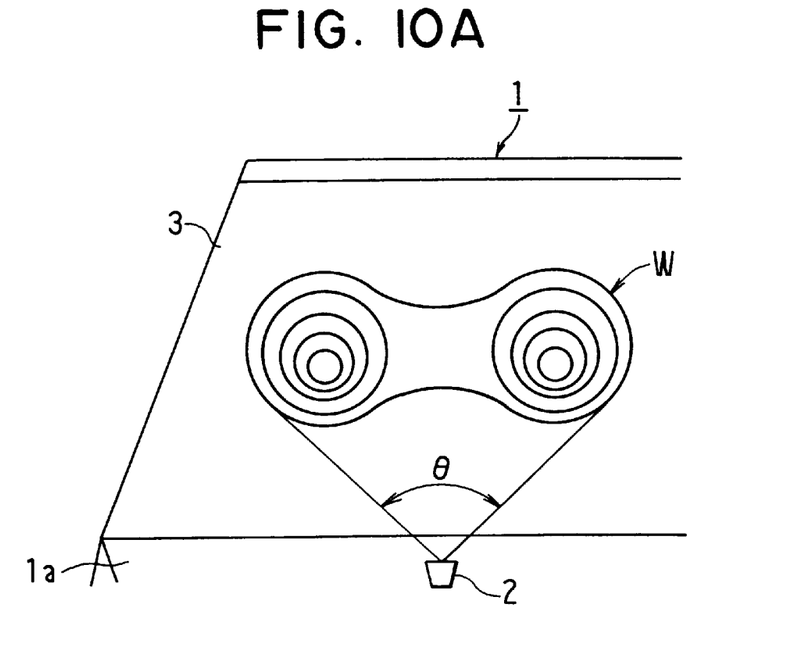
FIG. 10A is a schematic view showing a density distribution in a washer fluid-sprayed region in the case the flat spray-type washer nozzle is used, with the lengthwise direction of a jetting opening forming a right angle with a vehicle.

As shown in FIG. 10A, in the washer nozzle 2 of flat spray type, the atomized washer fluid S is jetted from the jetting opening 10 at a predetermined jetting angle θ in the lengthwise direction thereof. The jetting angle θ is determined according to the diameter of the fluid passage 7, the curvature of the dome of the fluid passage 7, and the length of the jetting opening 10 in its lengthwise direction. In the flat spray type nozzle, the flow rate distribution within the jetting angle θ is required to have a pattern having two flow rate peaks positioned at both ends of the distribution curve A, as shown in FIG. 8. That is, the usable condition of the washer nozzle of the flat spray type is that the ratio of a maximum peak value a of the distribution curve A shown in FIG. 8 to a minimum peak value b, namely, the ratio of a/b is more than 3.

Figure 9:
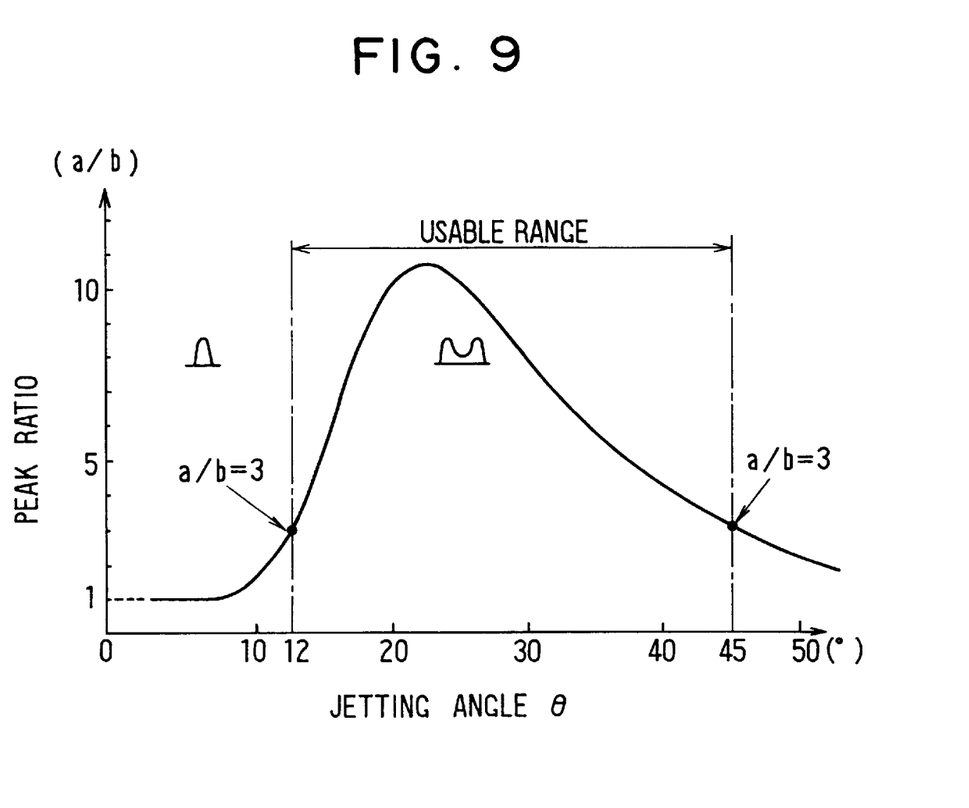
FIG. 9 is a graph showing the relationship between a jetting angle and a peak ratio.

More specifically, as shown in FIG. 9, the pattern of the flow rate distribution depends on the jetting angle θ. In the distribution pattern, when the jetting angle θ is 12° or more, the peak ratio of a/b becomes more than 3 and has two peaks. Because the jetting angle θ normally used in the conventional washer nozzle 2 for vehicles is smaller than 45°, the range of the jetting angle θ from 12° to 45° is the usable range of the washer nozzle 2 of flat spray type. It is preferred to set the jetting angle θ to 20°–40°. In the embodiment, the jetting angle θ is set to about 30°. When the jetting angle θ is more than 45°, the peak ratio of a/b continues to decrease. In the region in which the jetting angle θ is more than a predetermined one, the peak ratio of a/b approaches to 1.

The operation of the washer nozzle 2 having the jet 6 is described below.

In using the flat type washer nozzle as a horizontal type, a tool such as a driver is used to adjust the lengthwise direction of the jetting opening 10 to be coincident with the widthwise direction of the vehicle after the jet 6 is fitted in the concave 4a under pressure.

The washer fluid S which has flowed through the channel 5 is collected at the center of the fluid passage 7 along the domed portion formed at the front end thereof. Then, the washer fluid S is jetted from the gourd-shaped jetting opening 10. At this time, the flow rate of the washer fluid S is reduced at the center of the jetting opening 10 in its lengthwise direction by the reducing portion 11. Accordingly, the flow rate of the washer fluid S is increased at both sides of the jetting opening 10 in its lengthwise direction. The area of the jetting opening 10 is reduced at the center thereof in the lengthwise direction thereof, the flow rate of the washer fluid S at the center of the jetting opening 10 in its lengthwise direction is smaller than that of the washer fluid at the center of the conventional elliptic jetting opening in its lengthwise direction, whereas the flow rate thereof at both sides of the jetting opening 10 in its lengthwise direction is greater than that of the washer fluid at both sides of the conventional elliptic jetting opening in its lengthwise direction. Therefore, the pressure of the washer fluid S at both sides of the jetting opening 10 in its lengthwise direction is higher than that of the washer fluid at both sides of the conventional jetting opening in its lengthwise direction, which causes the jetting speed at both sides of the jetting opening 10 in its lengthwise direction to be faster than that at both sides of the conventional jetting opening in its lengthwise direction.

The gourd-shaped jet of the embodiment was compared with a comparative example having the conventional elliptic jet of the jetting opening. In the comparative example, the distribution of the flow rate of the washer fluid in the jetting angle and the height of the washer fluid-sprayed position during travel of the vehicle were examined. The jetting pressure was set to 98.1 kpa.

The flow rate distribution was determined by measuring the amount of washer fluid collected in each catch pan arranged on the washer fluid-sprayed surface along the jetting angle. The distance between the nozzle and the washer fluid-sprayed surface was set to 40 cm. The dependency of the height of the washer fluid-sprayed point on the speed of the vehicle was examined by changing it. The distance between the lower end of the front windshield glass 3 and the washer fluid-sprayed point (point at which the highest washer fluid-arrived point) was measured and set as the height of washer fluid-sprayed point. The results are shown in FIGS. 10B and 11B, based on a plurality of experimental data.

Figure 10B:
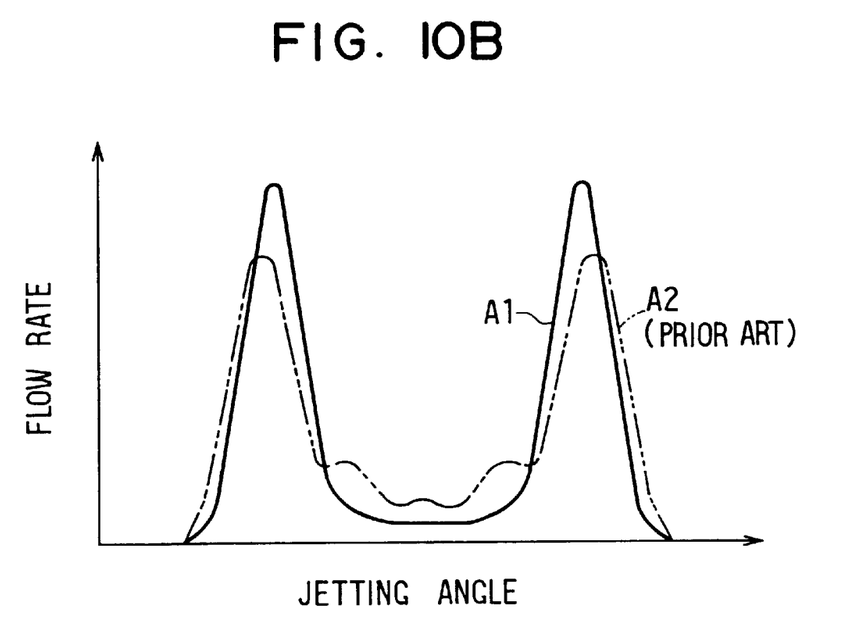
FIG. 10B is a graph showing a flow rate distribution in a jetting angle.

The graph shown in FIG. 10B indicates the flow rate distribution in the jetting angle of the washer fluid which landed at the front windshield glass 3. The experimentally obtained flow rate distribution shown in FIG. 10B includes a washer fluid-sprayed point perpendicular to the washer fluid-sprayed surface. The distribution curve A1 shown by a solid line indicates the flow rate distribution of the jet according to the embodiment, while the distribution curve A2 shown by a two-dot chain line indicates the flow rate distribution of the conventional jet. As indicated by the graph, the flow rate percentage at the center in the jetting angle of the washer fluid jetted from the gourd-shaped jetting opening of the embodiment is 20, whereas the flow rate percentage at the center in the jetting angle of the washer fluid jetted from the conventional elliptic jetting opening is 40. The flow rate percentage at both sides (narrow region) in the jetting angle of the washer fluid jetted from the jetting opening of the embodiment is 80, whereas the flow rate percentage at both sides in the jetting angle of the washer fluid jetted from the conventional jetting opening is 60. It is to be noted that the flow rate percentage corresponds to the area surrounded with the distribution curve. That is, as shown in FIG. 10A, the density of the washer fluid which was jetted from the jetting opening of the embodiment and landed at the center of the washer fluid-sprayed region W was lower than that of the washer fluid which was jetted from the conventional jetting opening and landed on the center thereof, whereas the density of the washer fluid which was jetted from the former and landed at both sides thereof was higher than that of the washer fluid which was jetted from the latter and landed at both sides thereof.

Figure 11A:
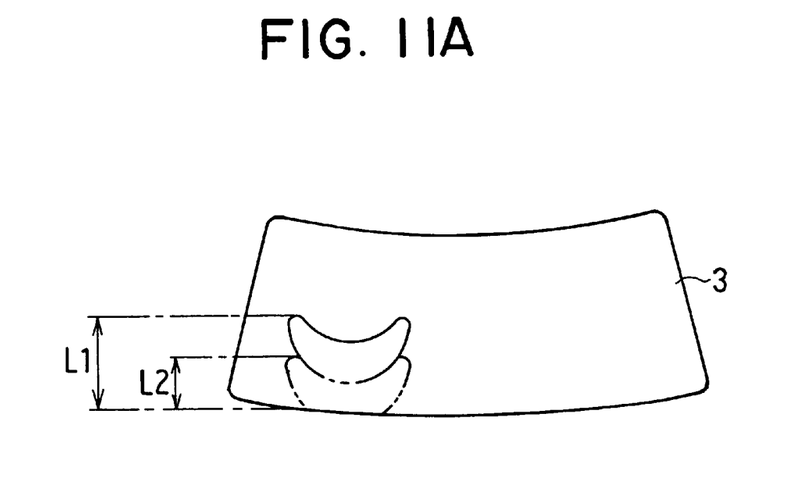
FIG. 11A is a schematic view showing a comparative example in which heights of washer fluid-sprayed positions are compared with each other.
Figure 11B:
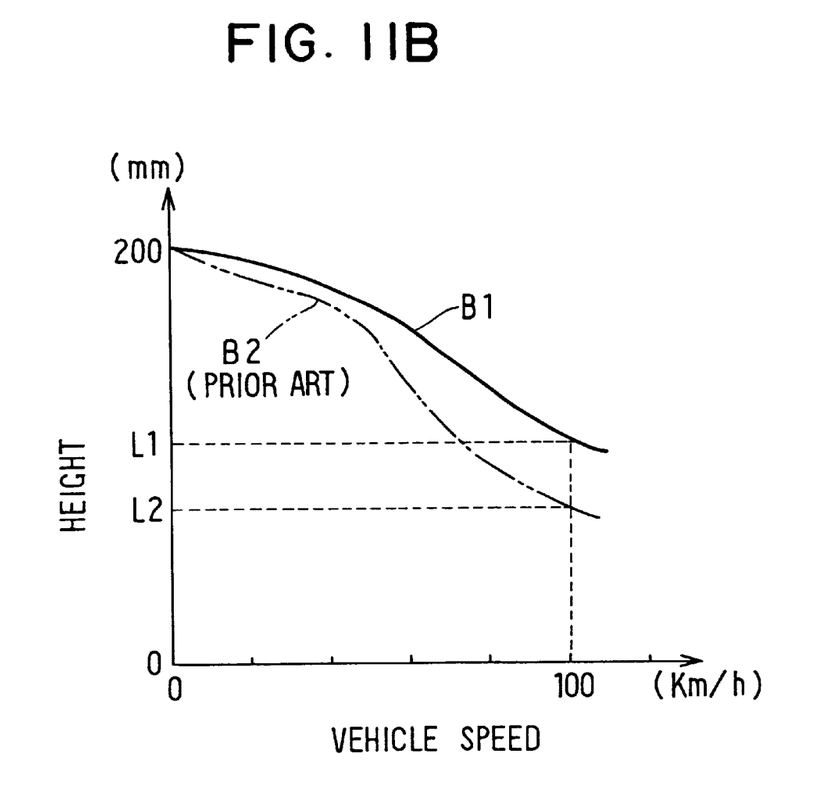
FIG. 11B is a graph showing the relationship between running speeds of a vehicle and heights of washer fluid-sprayed positions.

The graph shown in FIG. 11B indicates the experimentally obtained relationship between the vehicle speed (km/h) of the vehicle and the height of the washer fluid-sprayed point. The curve B1 shown by a solid line indicates the relationship obtained from the jet according to the embodiment, while the distribution curve B2 shown by a two-dot chain line indicates the relationship obtained from the conventional jet. The reduction rate of the height of the landed point of washer fluid jetted from the jetting opening according to the embodiment is smaller than that of the height of the landed point of washer fluid jetted from the conventional one, with the increase in the vehicle speed. The height of the landed point of washer fluid jetted from the jetting opening of the embodiment and that of the landed point of the washer fluid jetted from the conventional one are equally 200 mm when the vehicle is at rest, whereas when the running speed was 100 km/h, the height L1 (FIG. 11A) of the landed point of the washer fluid jetted from the former is 105 mm, whereas that L2 (FIG. 11A) of the landed point of the washer fluid jetted from the conventional one is 75 mm. That is, it was confirmed that the height of the washer fluid jetted from the former was higher than that of the washer fluid jetted from the latter by about 40%. Therefore, as shown in FIG. 10A, even when the vehicle is traveling at a speed as high as 100 km/h, the jetting angle of the embodiment is capable of jetting the washer fluid up to the height L1 corresponding to the visual field of the driver through the front windshield glass 3.

Figure 12A:
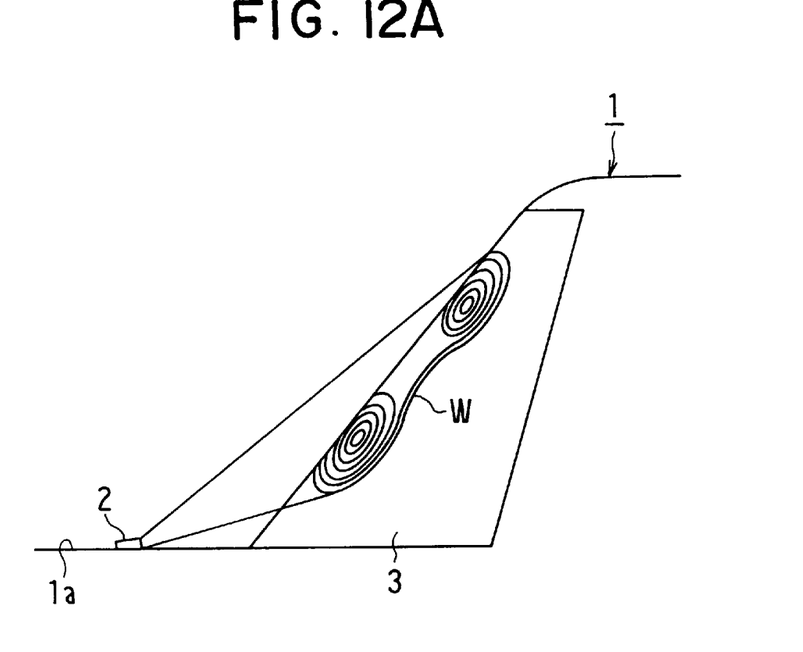
FIG. 12A is a schematic view showing a density distribution in a washer fluid-sprayed region in the case the flat spray-type washer nozzle is used, with the lengthwise direction of a jetting opening coincident with the widthwise direction of the vehicle.
Figure 12B:
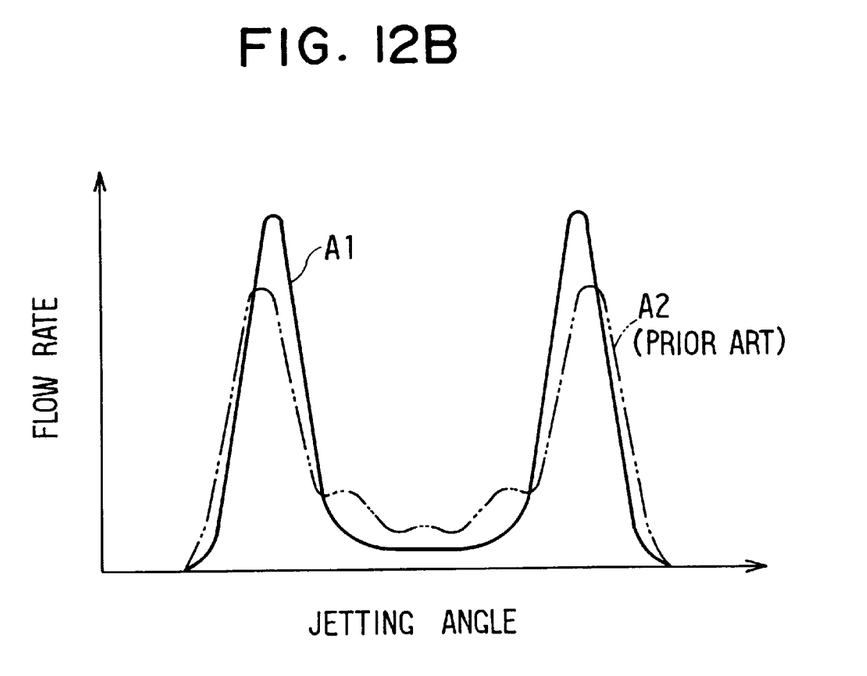
FIG. 12B is a graph showing a flow rate distribution in a jetting angle.

As shown in FIG. 12A, by a certain tool such as a screw driver, the lengthwise direction of the jetting opening 10 of the washer nozzle 2 can be adjusted to be at a right angle with the widthwise direction of the vehicle by rotating the jet 6. In this case, too, as shown in FIG. 12B, the flow rate percentage at the center in the jetting angle of the washer fluid jetted from the jetting opening is small, and the flow rate percentage at both sides in the jetting angle of the washer fluid jetted from the jetting opening is high. That is, as shown in FIG. 12A, the density of the washer fluid which is jetted from the jetting opening and lands at the center of the washer fluid-sprayed region W is low, and the density of the washer fluid which is jetted from the jetting opening and lands at both sides thereof is high. Because the distance between the washer nozzle 2 and the upper end of the washer fluid-sprayed region W is longer than that between the washer nozzle 2 and the lower end thereof, the density of the washer fluid at the upper end of the washer fluid-sprayed region W is lower than that of the washer fluid at the lower end thereof. Further, in the case where the washer nozzle 2 is used vertically relative to the widthwise direction of the vehicle, when the vehicle is running at a high speed, the jetting angle of the embodiment is capable of jetting the washer fluid higher than that of the conventional one because the washer fluid is jetted at a higher speed at both sides of the jetting angle than at the center thereof.

As described above, according to the embodiment, the following advantages can be obtained.

(1) The jetting opening 10 is gourd-shaped. Further, the flow rate of the washer fluid jetted from the jetting opening 10 is low at the center of the jetting angle and high at both sides of the jetting angle. Therefore, the density of the washer fluid which is jetted from the jetting opening and lands at the center of the washer fluid-sprayed region is low, which allows the driver to secure the visual field therethrough when the washer fluid is jetted to the washer fluid-sprayed region. In addition, the flow rate of the washer fluid jetted from the jetting opening 10 is high at both sides of the jetting angle of the washer fluid jetted from the jetting opening 10, and thus the washer fluid is jetted from both sides at a speed higher than that of the washer fluid jetted from the conventional jetting angle. Accordingly, when the vehicle is running at a high speed, the jetting opening 10 is capable of jetting the washer fluid higher than the conventional one.

(2) As the projected amount d of the reducing portion 11 is 0.1 mm or more, the flow rate of the washer fluid can be reduced sufficiently in the center of the jetting angle of the washer fluid jetted from the jetting opening 10.

(3) As the reducing portions 11 have a curvature varied continuously with the curvatures of other portions of the jetting opening 10, a lower energy loss is used when the washer fluid is jetted from the jetting opening 10 and further, when the vehicle is running at a high speed, the jetting opening 10 is capable of jetting the washer fluid high on the front windshield glass.

The present embodiment is not limitative but may be modified in many ways as described below.

Figure 13:
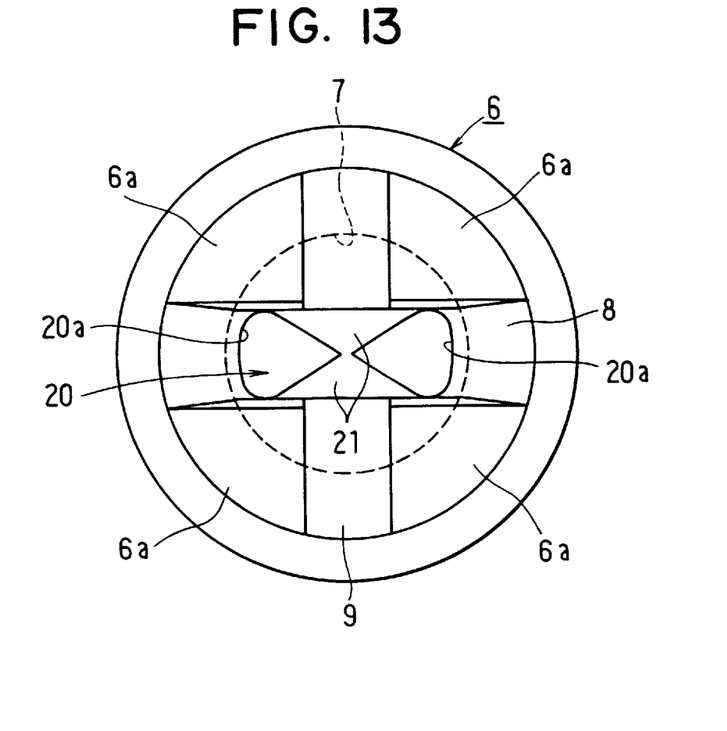
FIG. 13 is a front view showing a jet having a jetting opening according to a modification of the embodiment.

The shape of the jetting opening is not limited to that of a gourd. For example, as shown in FIG. 13, it is possible to reduce the longitudinal center of a jetting opening 20 in the lengthwise direction thereof to such an extent as to form two openings 20a at both sides of a reducing portion 21. This construction allows the flow rate of the jetting angle of the washer fluid jetted from the jetting opening 20 to be low at the center thereof and high at both sides thereof, thus enabling the driver to secure the visual field sufficiently and the washer fluid to be jetted to a higher position of the front windshield glass 3 when the vehicle is running at a high speed.

Figure 14A:
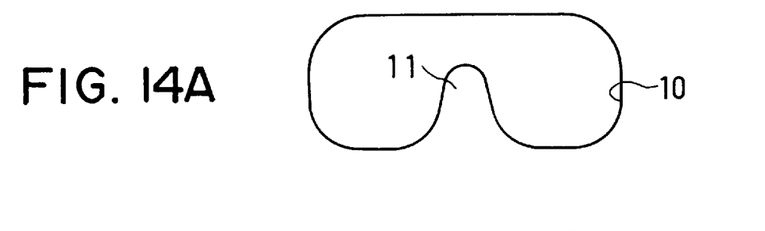
FIG. 14A through 14C are schematic views showing jetting openings according to the modification shown in FIG. 13.
Figure 14B:
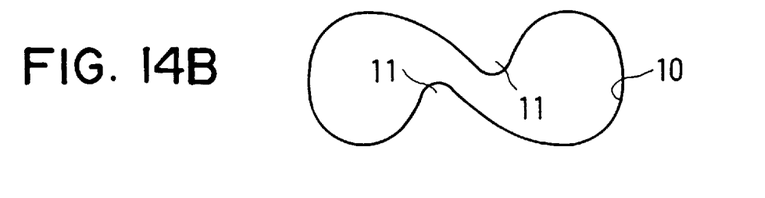
Figure 14C:
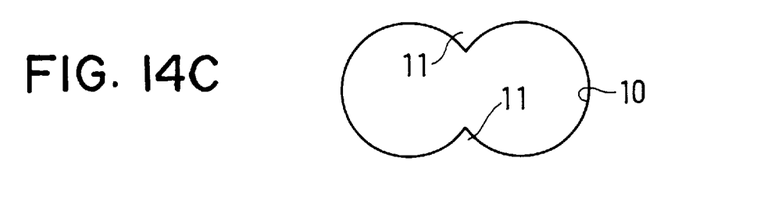

The gourd shape of the jetting opening 10 may be different from that described in the embodiment. For example, it is possible to form the shapes of the jetting opening 10 as shown in FIGS. 14A through 14C. In an example shown in FIG. 14A, the reducing portion 11 is projected only from one side of the jetting opening 10 in the widthwise direction thereof. Thus, both opening portions of the jetting opening 10 are symmetrical with respect to the reducing portion 11. In an example shown in FIG. 14B, a pair of the reducing portions 11 projecting from both sides of the jetting opening 10 in the widthwise direction thereof is shifted in the lengthwise direction thereof. In this example, the opening portions of the jetting opening 10 are in rotation-symmetrical relationship. In an example shown in FIG. 14C, two rings are overlapped on each other partly to form a gourd-shaped jetting opening 10. The jetting opening 10 may be formed not in molding resin but can be easily formed by machining the jet 6 after molding.

The washer nozzle may be used to jet the washer fluid to a rear windshield glass as well as the front windshield glass. When the washer nozzle is used for the front windshield glass, it is provided for both the driver's seat and the front passenger's seat.

The grooves 8 and 9 and the extended portion 6a defined by the grooves 8 and 9 may be omitted. The nozzle body and the jet may be formed integrally.

According to the above construction, the jetting angle is divided into two parts by the reducing portion. This allows the flow rate of the washer fluid jetted from the jetting opening to be low at the center of the jetting angle and sufficiently high at both sides thereof.

The reducing portion 11 has a curvature varied continuously with the curvatures of other portions of the jetting opening 10. This reduces the energy loss when the washer fluid is jetted from the reducing portion.

The jetting angle is set to 20° to 40°. This allows the flow rate of the washer fluid jetted from the jetting opening to be low at the center of the jetting angle and sufficiently high at both sides thereof.

The jet installed on the vehicle is rotatable on its longitudinal axis so as to adjust the orientation of the jetting opening, thus enabling the washer nozzle to be used, with the lengthwise direction of the jetting opening coincident with the widthwise direction of the vehicle or perpendicular to the widthwise direction thereof.

Figure 15:
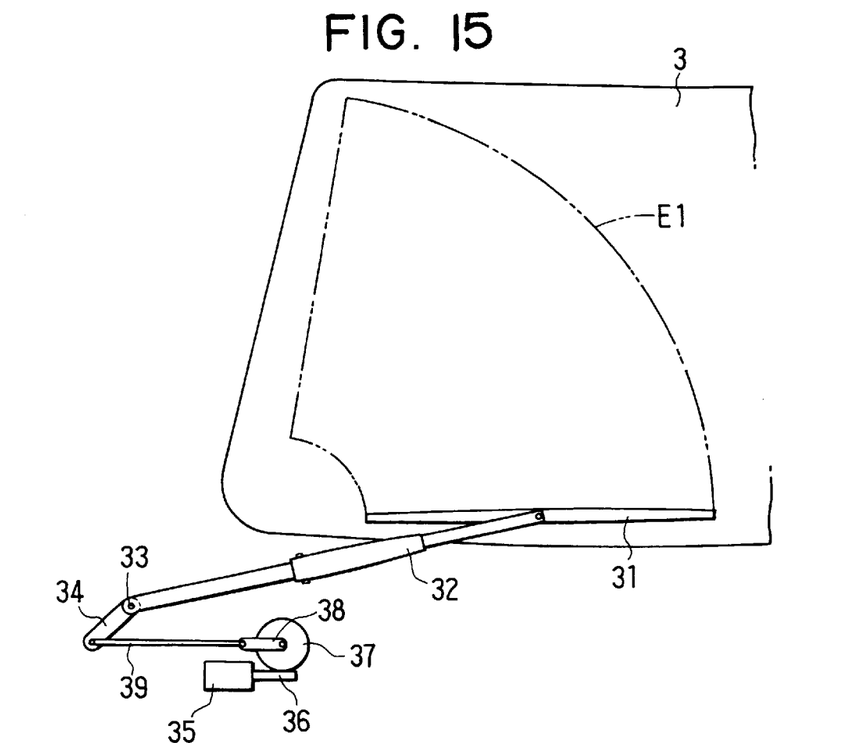
FIG. 15 is a front view of a wiper system using the washer nozzle according to the embodiment.

The above-described washer apparatus will be used in a wiper system shown in FIG. 15 for wiping the front windshield glass 3 at the driver's seat side. The wiper system is positioned below the front windshield glass 3. The wiper system comprises a wiper blade 31 for wiping the front windshield glass 3 at the driver's seat side. As shown by a two-dot chain line in FIGS. 15 and 16, the wiper blade 31 pivots in a wiping range E1 shown by a two-dot chain line, namely, between the lower edge of the front windshield glass 3 and a side edge thereof so as to wipe the wiping range E1 of the front windshield glass 3 in its reciprocating motion.

The base of a wiper arm 32 supporting the wiper blade 31 at its front end is rotatably connected with a shaft 33 fixed to the frame of the vehicle. The shaft 33 is connected with the base of a driven lever 34 in such a manner that the driven lever 34 rotates together with the wiper arm 32 on the shaft 33. A motor 35 is fixed to the vehicle chassis. A worm 36 is connected with the output shaft of the motor 35. A driving lever 38 is fixed to the center of a worm wheel 37 engaging the worm 36. The front end of the driving lever 38 is connected with the front end of the driven lever 34 through a link rod 39.

The wiper system having the above construction is driven by a known method by operating a washer-driving switch. Upon turn-on of the washer-driving switch, the washer system is actuated to cause the washer nozzle 2 to jet the washer fluid from the jetting opening. After the washer fluid lands the front windshield glass 3, the wiper system is driven for a certain period of time by a known method.

When the motor 35 is driven, the rotational force of the worm wheel 37 driven by the motor 35 is converted into a push-pull force of the link rod 39 through the driving lever 38. As a result, the driven lever swings, thus driving the wiper arm 32. The wiper arm 32 reciprocates between the lower inversion position and the upper inversion position per rotation of the worm wheel 37.

In the state in which the wiper arm 32 is located at the lower end position, the wiper arm 32 is positioned at a waiting position (home position). When the worm wheel 37 makes a half turn from the waiting position, the wiper arm 32 reaches the upper end position. When the worm wheel 37 makes another half turn, the wiper arm 32 reaches the lower end position.

Figure 16:
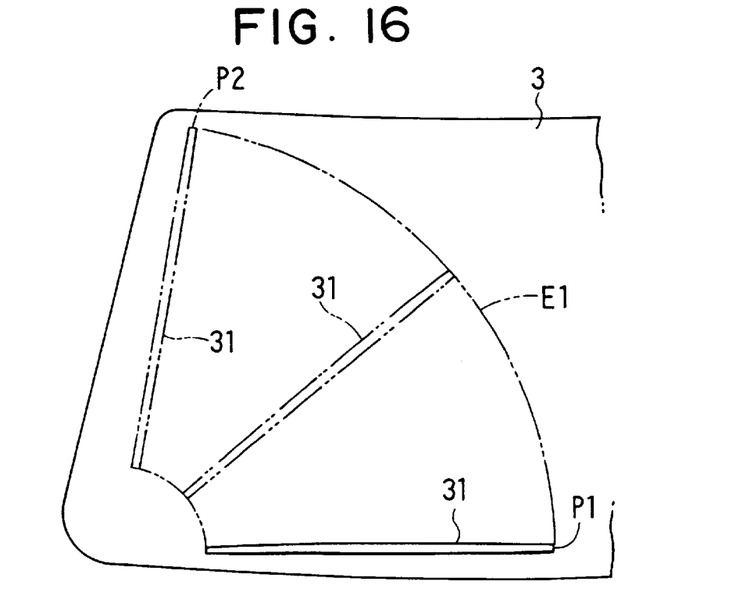
FIG. 16 is a schematic view showing the wiping range of the wiper system.

When the wiper arm 32 is located at the lower end position, the wiper blade 31 is positioned at a lower end position P1 shown by a solid line in FIG. 16. When the wiper arm 32 is located at the upper end position, the wiper blade 31 is positioned at a side end position P2 shown by a one-dot chain line in FIG. 16. Based on the reciprocating motion of the wiper arm 32, the wiper blade 31 reciprocates between the lower end position P1 and the side edge position P2, thus wiping the wiping range E1, of the front windshield glass 3, shown by the one-dot chain line in FIGS. 15 and 16.

In this wiper system, the washer nozzle 2 having the above-described construction may be used as follows.

Figure 17:
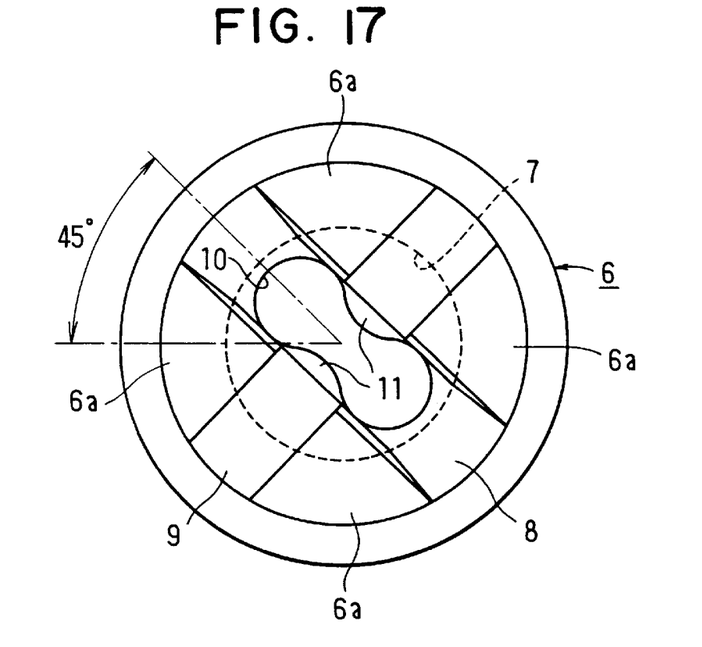
FIG. 17 is a front view showing the orientation of the jet in the wiper system.

A tool such as a screw driver is used to orient the jet 6 at the driver's seat side to the center of the front windshield glass and then, the lengthwise direction of the jetting opening 10 is adjusted to be coincident with the widthwise direction of the vehicle when the jet 6 is viewed from the driver's seat. When the washer fluid is jetted from the washer nozzle 2 in this state, the washer fluid lands on the front windshield glass 3. In the fan-shaped washer fluid-sprayed region W, the density of the washer fluid is low at the center thereof and high at both sides thereof.

Thereafter, the tool such as the screw driver may be used again to rotate the jetting opening 10 at about 45° clockwise when the jet is viewed from the driver's seat. That is, the lengthwise direction of the jetting opening 10 is adjusted to incline the lengthwise direction of the jetting opening 10 by 45° relative to the widthwise direction of the vehicle.

Figure 18:
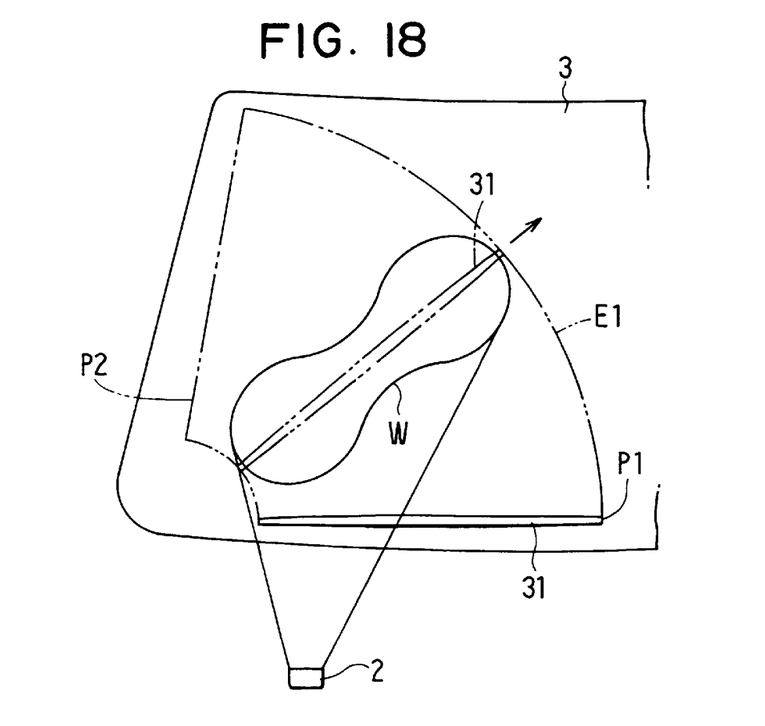
FIG. 18 is a schematic view showing the shape of the washer fluid-sprayed region formed by the jet shown in FIG. 17.

When the jetting opening 10 is thus rotated at about 45° clockwiseWith, the washer fluid-sprayed region W becomes the shape shown in FIG. 18 when the front windshield glass 3 is viewed in front of the vehicle . The washer fluid-sprayed region W is fan-shaped and inclines by about 45° relative to the widthwise direction of the vehicle. In the lengthwise direction of the washer fluid-sprayed region W, the density of the washer fluid is low at the center thereof and high at both sides thereof.

Figure 19:
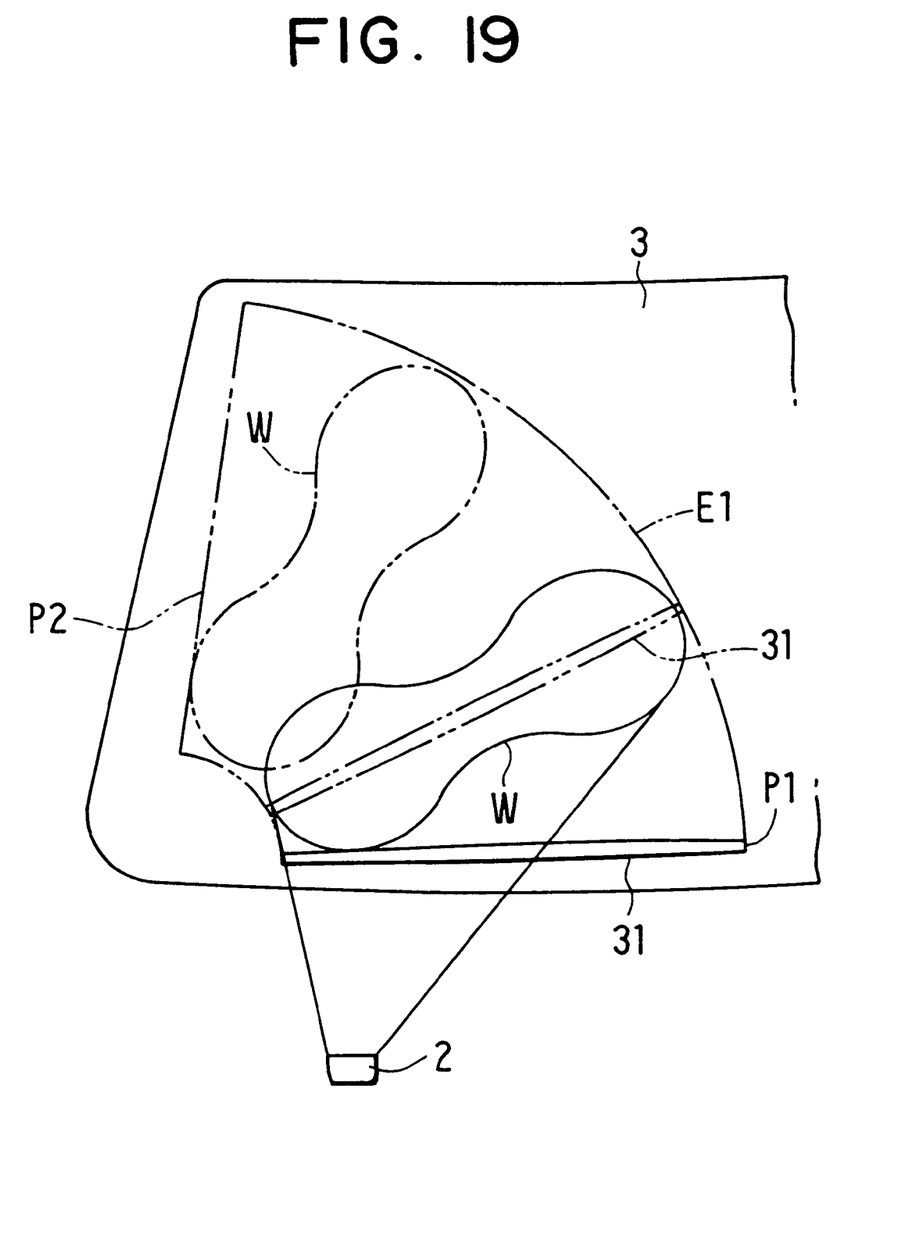
FIG. 19 is a schematic view showing the relation between the washer fluid-sprayed region and the wining region.

The washer fluid-sprayed region W is included within the wiping range E1 of the wiper blade 31 and intermediate between the lower end position P1 and the side edge position P2. Further, the washer fluid-sprayed region W is shaped in such a manner that the lengthwise direction of the washer fluid-sprayed region W is parallel with the lengthwise direction of the wiper blade 31 when the wiper blade 31 passes the washer fluid-sprayed region W.

Accordingly, when the washer fluid lands on the front windshield glass 3, as shown in FIG. 18, the wiper blade 31 is capable of wiping the washer fluid in the whole region thereof in its lengthwise direction. Thus, the washer fluid can be spread in the region E1 entirely. That is, the washer fluid is not wasted and the front windshield glass 3 can be cleaned efficiently.

Further, because the fan-shaped washer fluid-sprayed region W is included within the wiping region E1 of the wiper blade 31 and formed intermediately between the lower end position P1 and the side edge position P2, the front windshield glass 3 can be cleaned efficiently.

The density of the washer fluid which lands on the washer fluid-sprayed region W of the front windshield glass 3 is low at the center thereof and high at both sides thereof, the driver is obstructed less.

The wiper system may be modified as follows.

(1) Even in case the wiper system is applied to a light car or large-size vehicle such as a bus, a truck, and the like, the washer fluid can be spread on the entire wiping range E1. Consequently, the washer fluid is not used wastefully and the front windshield glass 3 can be efficiently cleaned.

(2) Although the wiper system is applied to the front windshield glass at the driver's seat side in the embodiment, it may be applied to the front windshield glass at the front passenger's seat side or to the rear windshield glass. In this case, too, the washer fluid can be spread on the entire wiping range E1. Consequently, the washer fluid is not used wastefully and the front windshield glass 3 and the rear window can be efficiently cleaned.

(3) Although the washer fluid-sprayed region W is formed intermediately between the lower end position P1 and the side edge position P2, the washer fluid-sprayed region W may be formed at a desired position, provided that the lengthwise direction of the washer fluid-sprayed region W is parallel with the lengthwise direction of the wiper blade 31 when the wiper blade 31 passes the washer fluid-sprayed region W. Accordingly, by adjusting the orientation of the jetting opening 10, the washer fluid-sprayed region W may be formed at a position adjacent to the lower end position P1, of the wiper blade 31, shown by the solid chain line in FIG. 16 or at a position adjacent to the side edge position P2, of the wiper blade 31, shown by the one-dot chain line of FIG. 16.

(4) In the embodiment, the width of the washer fluid-sprayed region W in the lengthwise direction thereof is generally equal to that of the wiper blade 31 in the lengthwise direction thereof. However, the width of the washer fluid-sprayed region W in the lengthwise direction thereof may be shorter than that of the wiper blade 31 if the washer fluid is not used wastefully and can be efficiently used.

What is claimed is:

1. A washer nozzle for jetting a washer fluid to a windshield glass of a vehicle, comprising:
   a nozzle body;
   a jet rotatable fitted in said nozzle body, said jet having a slot-shaped jetting opening for jetting the washer fluid therefrom;
   a fluid passage guiding the washer fluid to the jetting opening and domed in an inner surface of a portion at which the jetting opening is formed;
   extended portions capable of externally rotating said jet; and
   a reducing portion positioned at a center of the jetting opening in a lengthwise direction thereof such that both sides of the reducing portion are symmetrical with respect to a line passing through the center of the reducing portion and extending in the lengthwise direction of the reducing portion;
   wherein said extended portions extend in a fluid-jetting direction from said jetting opening and thereby define a groove to enable external rotation of said jet.

2. The washer nozzle according to claim 1, wherein said groove is formed into a cross shape, and a center of said cross shape is disposed on said reducing portion.

3. A washer apparatus for a vehicle comprising:

a washer nozzle including a nozzle body, a jet rotatably fitted in said nozzle body, said jet having a jetting opening extending generally longitudinally for jetting a washer fluid therefrom, a fluid passage guiding the washer fluid to the jetting opening and domed in an inner surface of a portion at which the jetting opening is formed, extended portions capable of externally rotating said jet, and a reducing portion positioned at a center of the jetting opening in a longitudinal direction thereof such that both sides of the reducing portion are symmetrical with respect to a line passing through the center of the reducing portion and extending in the longitudinal direction of the reducing portion;

a washer tank for storing the washer fluid; and a washer pump for feeding the washer fluid stored in the washer tank to the washer nozzle;

wherein said extended portions extend in a fluid-jetting direction from said jetting opening and thereby define a groove to enable external rotation of said jet.

4. The washer apparatus according to claim 3, wherein said groove is formed into a cross shape, and a center of said cross shape is disposed on said reducing portion.

5. A washer nozzle for a vehicle comprising:

a nozzle body having a washer fluid channel and a generally spherical concavity at an end of said channel; and a jet having a generally spherical shape and fitted rotatably in said concavity, said jet having a passage therein and an opening longitudinally extending to jet washer fluid supplied through said channel and said passage toward a windshield of the vehicle, said opening having at both longitudinal ends thereof an opening area larger than that at a longitudinal center thereof;

wherein said jet has extended portions which define a groove extending longitudinally along said opening and provided at a side opposite to said passage with respect to said opening, said groove enabling rotation of said jet externally.

6. The washer nozzle according to claim 5, wherein:

said groove is formed into a cross shape; and a center of said cross shape is disposed on a center of said opening in a longitudinal direction.

* * * * *